UNITED STATES PATENT OFFICE.

ROBERT E. SCHMIDT, OF ELBERFELD, GERMANY, ASSIGNOR TO THE FARBENFABRIKEN OF ELBERFELD COMPANY, OF NEW YORK.

ANTHRARUFIN DYE AND PROCESS OF MAKING SAME.

SPECIFICATION forming part of Letters Patent No. 658,514, dated September 25, 1900.

Application filed August 3, 1899. Serial No. 725,981. (Specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in Anthrarufin Dyes; and I hereby declare the following to be a clear and exact description of my invention.

In the specification to Letters Patent No. 595,349 I have described the manufacture of a disulfonic acid of paradiamidoanthrarufin, having the formula

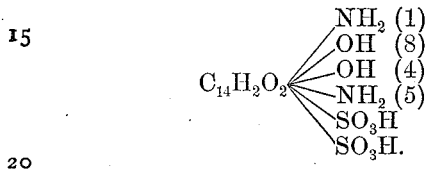

I have now found that a valuable new dyestuff can be obtained by subjecting the said disulfonic acid to the action of formic aldehyde in the presence of alkaline bisulfites.

In carrying out my new process practically I can proceed as follows (the parts being by weight:) A mixture prepared from one hundred parts of a watery paste of diamidoanthrarufin disulfonic acid, (containing twenty per cent. of this acid,) fifteen parts of a forty-per cent. formic-aldehyde solution, and twenty parts of a forty-per-cent. sodium-bisulfite solution is stirred for a short while at about 50° centigrade until the reaction mixture has transformed into a pure greenish-blue and clear solution. On mixing this solution with an excess of a forty-per-cent. sodium-bisulfite solution and allowing the same to stand for a while at ordinary temperature a dark-blue crystalline precipitate is separated therefrom, which is filtered off, dried, and pulverized. The dark-blue powder thus obtained represents my new dyestuff. From the diamidoanthrarufin disulfonic acid the new coloring-matter is distinguished by the following reactions: It is soluble in cold water with a much greater readiness than the said acid. While the diamidoanthrarufin disulfonic acid dissolves in water with a pure blue color and is precipitated from this solution by the addition of strong hydrochloric acid, (the color of the solution being at the same time changed into violet,) the water solution of the new dyestuff exhibits no considerable change when subjected to the same condition.

The shades obtained on unmordanted wool in acid baths by means of the new dyestuff are very bright and more greenish blue than those producible with the aid of diamidoanthrarufin disulfonic acid.

When heated with a fifteen-per-cent. hydrochloric acid, the new dyestuff is split, diamidoanthrarufin disulfonic acid being separated. By concentrated sulfuric acid the new coloring-matter is dissolved with a yellow color, which is changed into greenish blue on the addition of boric acid. The absorption spectrum of this greenish-blue solution is identical with that of the boric ethers of the diamidoanthrarufin disulfonic acid.

Having now described my invention and in what manner the same is to be performed, what I claim as new, and desire to secure by Letters Patent, is—

1. The process for producing a new anthrarufin dyestuff which process consists in first heating a mixture prepared from diamidoanthrarufin disulfonic acid, a formic-aldehyde solution and a solution of an alkaline bisulfite secondly separating the new dyestuff from the solution thus obtained and finally isolating the same, substantially as hereinbefore described.

2. The herein-described new anthrarufin dyestuff being when dry and pulverized a dark-blue powder easily soluble in water with a greenish-blue color which is not considerably changed on the addition of hydrochloric acid, being split under regeneration of diamidoanthrarufin disulfonic acid when heated with a fifteen-per-cent. hydrochloric acid, dyeing unmordanted wool bright greenish-blue shades, substantially as hereinbefore described.

In testimony whereof I have signed my name in the presence of two subscribing witnesses.

ROBERT E. SCHMIDT.

Witnesses:
R. E. JAHN,
OTTO KÖNIG.